United States Patent [19]

Foust et al.

[11] Patent Number: 5,076,918
[45] Date of Patent: * Dec. 31, 1991

[54] QUICK CHANGE OIL FILTER

[75] Inventors: Kenneth A. Foust, Scottsdale, Ariz.; Benjamin V. Booher, Leucadia, Calif.

[73] Assignee: Zipoff Oil Filters, Inc., Leucadia, Calif.

[*] Notice: The portion of the term of this patent subsequent to Jul. 25, 2006 has been disclaimed.

[21] Appl. No.: 475,271

[22] Filed: Feb. 5, 1990

[51] Int. Cl.$^5$ ............................................. B01D 27/08
[52] U.S. Cl. .................................. 210/238; 210/444; 210/450; 210/DIG. 17
[58] Field of Search ............... 210/232, 236, 238, 440, 210/444, 450, DIG. 17

[56] References Cited

U.S. PATENT DOCUMENTS

| 1,741,705 | 12/1929 | Liddell | 210/443 |
|---|---|---|---|
| 2,284,447 | 5/1942 | Redner | 210/238 |
| 2,343,636 | 3/1944 | Bentley | 210/140 |
| 2,657,807 | 11/1953 | Launder | 210/183 |
| 2,728,458 | 12/1955 | Schultz | 210/148 |
| 3,085,688 | 4/1963 | Eberle | 210/440 |
| 3,508,657 | 4/1970 | Cooper | 210/232 |
| 4,017,397 | 4/1977 | Copeland | 210/238 |
| 4,028,243 | 6/1977 | Offer et al. | 210/DIG. 17 |
| 4,052,307 | 10/1977 | Humbert, Jr. | |
| 4,297,212 | 10/1981 | Padgett, Sr. | 210/168 |
| 4,338,189 | 7/1982 | Johnson, Sr. | 210/180 |
| 4,349,438 | 9/1982 | Sims | 210/180 |
| 4,371,439 | 2/1983 | Thornton | 210/232 |
| 4,443,334 | 4/1984 | Shugarman et al. | 210/168 |
| 4,767,530 | 8/1988 | Gilliam et al. | 210/236 |
| 4,851,117 | 7/1989 | Foust | 210/236 |

Primary Examiner—W. Gary Jones
Assistant Examiner—Matthew O. Savage
Attorney, Agent, or Firm—Baker, Maxham, Jester & Meador

[57] ABSTRACT

A quick release disposable filter cartridge for detachably coupling to a filter fitting of a circulating fluid system, comprises a canister having an open end and a closed end with an inlet and an outlet coaxially disposed at the open end thereof, an annular seal on the open end of the canister for sealingly engaging a filter fitting, a coupling comprising an elongated shaft coaxially mounted within the canister with a threaded inner end at the open end of the canister for coupling the canister to and drawing the annular seal means into the sealing engagement with the filter fitting in response to rotation of the canister, and an external outer end extending to the exterior of the canister, and quick release device comprising a cam and lever operatively coupled with the shaft for moving it axially relative to the seal for releasing the seal.

12 Claims, 3 Drawing Sheets

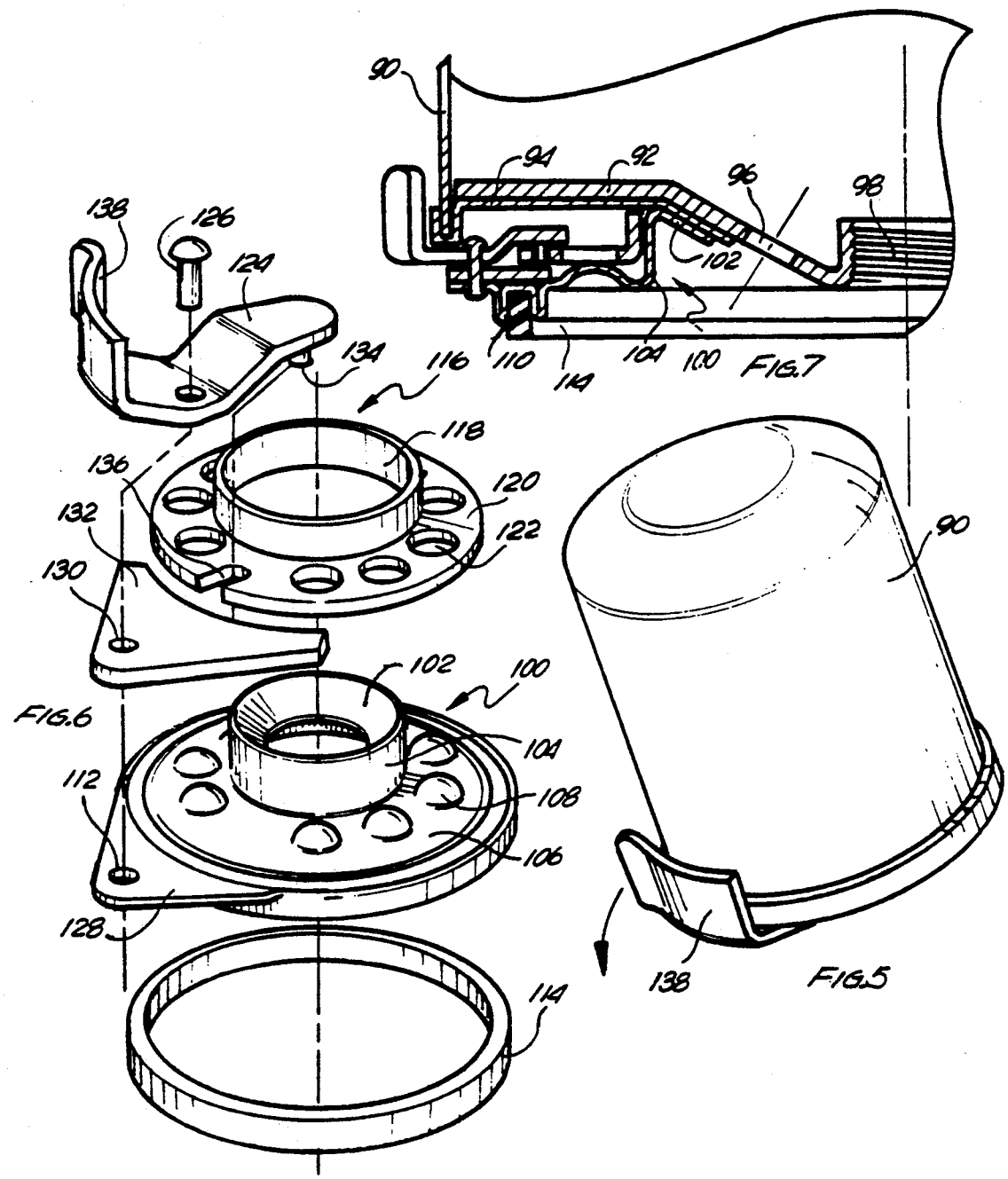

QUICK CHANGE OIL FILTER

BACKGROUND OF THE INVENTION

The present invention relates to filter devices for circulating fluids and pertains particularly to an improved oil filter for enabling quick and easy removal.

In U.S. Pat. No. 4,851,117, entitled FILTER DEVICE, and issued July 25, 1989 to Kenneth A. Foust, co-inventor herein, there is disclosed a novel filter device with means for releasing or reducing the removal torque required to ,, remove the filter. The filter device includes a canister and embodies a novel quick release fitting wherein a central coupling member is axially moveable to move the canister out of sealing engagement, with the fluid system filter fitting to relieve removal torque on the filter. However, that system is difficult and expensive to manufacture because of certain structures thereof. The present invention was devised to simplify the structure, its operation, and reduce the cost of manufacture thereof.

SUMMARY AND OBJECTS OF THE INVENTION

It is the primary object of the present invention to provide an improved quick release filter device In accordance with a primary aspect of the present invention, a filter canister having a coupling at one end includes a coupling release means for relieving the torque required for removing the canister.

BRIEF DESCRIPTION OF THE DRAWING

The above and other objects and advantages of the present invention will become apparent from the following description when read in conjunction with the accompanying drawings wherein:

FIG. 5 is a perspective view of a further embodiment of the invention;

FIG. 6 is an exploded perspective view of the embodiment of FIG. 5; and

FIG. 7 is a partial side view in section illustrating details of the embodiment of FIG. 5.

DETAILED DESCRIPTION OF A PREFERRED EMBODIMENT

Figure 1:
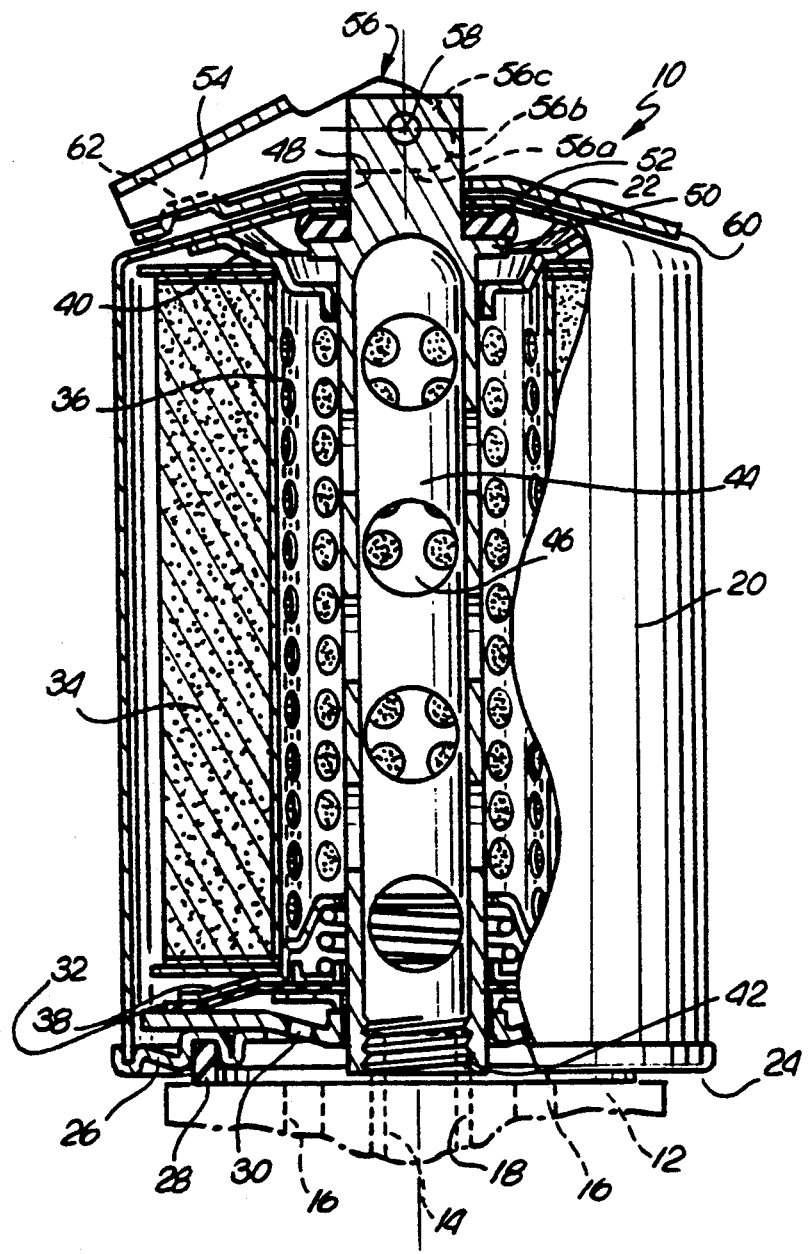
FIG. 1 is a side elevational view partially in section illustrating a preferred embodiment of the invention.
Figure 2:
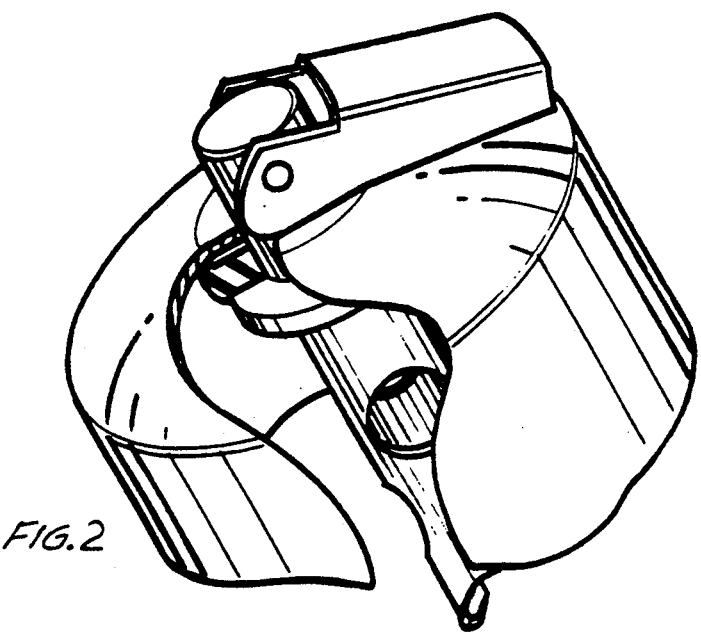
FIG. 2 is a perspective view of the embodiment of FIG. 1.

Referring to the drawings, and particularly to FIG. 1, there is illustrated a quick change oil filter in accordance with the present invention, designated generally by the numeral 10. The filter is of the cartridge type that is adapted to fit an oil filter fitting of an engine block (shown in phantom), and typically comprising a central return port 14 which is typically a return port, and annularly disposed ports 16 which are typically supply or output ports for communicating from the engine to the filter.

The oil filter fitting of the engine block typically includes a coupling, which comprises an outwardly extending or projecting threaded pipe or tube for receiving internally threaded coupling of a filter canister. The filter canister is rotated about its axis in order to screw it on and off the fitting.

The canister 10 comprises a generally cylindrical housing 20 having an outer normally closed end 22, and an inner end 24 which may be referred to as an open end. The inner open end is provided with an end cover or plate 26 that covers the end and supports an annular seal 28 that seats against the filter fitting 12 at a position radially outward from the port 16 for sealing the canister to the filter fitting.

The illustrated filter is conventional in that it includes radially outwardly disposed inlet ports 30 for receiving a flow of oil from outlet ports 16 of the filter fitting, and passes the oil by way of a one-way non return spring valve 32 to the interior of the housing, where it passes through a filter medium 34 and through an inner perforated sleeve 36 for return along a central passageway to the return port of the engine oil system.

The filter medium 34 is typically a fiber sleeve, such as corrugated paper or the like, and is mounted between an annular support seat 38 at the bottom of the housing and a similar annular seat 40 at the top of the housing. A threaded coupling 42 at the open or inner end of the housing couples the filter to the filter attachment nipple 18, and functions to draw the cartridge and the seal 18 forward toward the filter fitting 12 into sealing engagement therewith. Conventional disposable filters function in this manner and are threaded onto and off of the coupling nipple 18 by hand or in some cases by a special wrench. After the filter has been in place and hot oil flowing through it for some time, the annular seal 28 tends to stick to the sealing surface of the fitting 12. Thus, considerably more torque is required to remove the filter than was required to put it on in sealing engagement.

The present invention provides release means in the form of an axially movable sleeve or shaft 44, which includes a threaded coupling 42, and is perforated with fluid openings 46 opening into a central bore for communicating fluid from the interior of the filter back to the inlet 14 of the engine filter fitting. This shaft 44 has a threaded inner end 42 for threadably coupling to nipple 18. It also has an outer end that extends through a hole or opening 48 in the top or outer end 22 of the housing 20 for connection to a cam actuating assembly to be described. A radial flange 50 on the shaft 44 engages and normally biases an O-ring seal 52 into sealing engagement with the inner surface of the housing 22 around the port or bore 48.

A cam and lever assembly comprises a lever 54 having a cam surface 56 thereon at an inner end thereof. The lever is pivotably mounted at its inner end by pin 58 to the outer end of the shaft 44, and with cam 56 acting on a reinforcing plate 60 on the top or outer end of the canister. The cam surface has a flat or intermediate radius surface portion 56a for a normal operating position. A lobe or large radius surface portion 56b is disposed between normal position surface 56a and a short radius or release position 56c. These cam surfaces engage or act on the surface of plate 60 or other suitable follower surfaces.

The plate 60 may be an add on for thin wall canisters of existing technology in order to accommodate the cam forces. However, the plate may be incorporated in the end wall in the initial manufacture. The cam surface 56 has a varying radius such that in the illustrated position, the maximum radius exists between the axis of pin 58 and a cam surface portion 56a for biasing the shaft 44 and consequently the coupling 42 to its innermost or normal operating position. The shaft 44 is retained against rotation relative to the canister about its axis by shoulders 62 on the plate 60 engaged by lever 54. A plate 60 may be required when the canister is made of the typical thin sheet metal of current technology. However, other means of reinforcing the outer end of the canister may be used, such as contours and the like. The canister may also be constructed or any number of different materials such as some of the more recently developed plastics and composites, such as high temperature resin technologies.

The cam surface, as pointed out above, has a lobe between an intermediate rise or radius and a shorter radius position. When the lever 54 is pivoted clockwise from its present illustrated position to a position where the outer portion 56c of cam surface 56 is resting on the plate 60, the coupling 42 is released and moved forward relative to the seal 28 to move the seal 28 backward and retract it from sealing engagement with the sealing surface of the fitting 12. This removes the torque and friction resulting from the engagement of seal 28 with the surface of fitting 12, such that the cartridge can now be threadably removed from the nipple or fitting 18 by hand.

This provides a quick manual change oil filter wherein release and pivoting of the cam lever 54 releases the outer annular seal and the removal torque required of the canister. The lever is held against pivoting and rotating relative to the housing by an over center portion 56b of the cam, but may also or additionally be held by suitable seal means such as a tape or wire. The cam surface has a flat or intermediate radius surface portion 56a for a normal operating position. A lobe or large radius surface portion 56b is disposed between normal position surface 56a and a short radius or release position 56c. These surfaces engage or act on the surface of plate 60 or other suitable follower surfaces when lever 54 is pivoted about pin 58.

Figure 3:
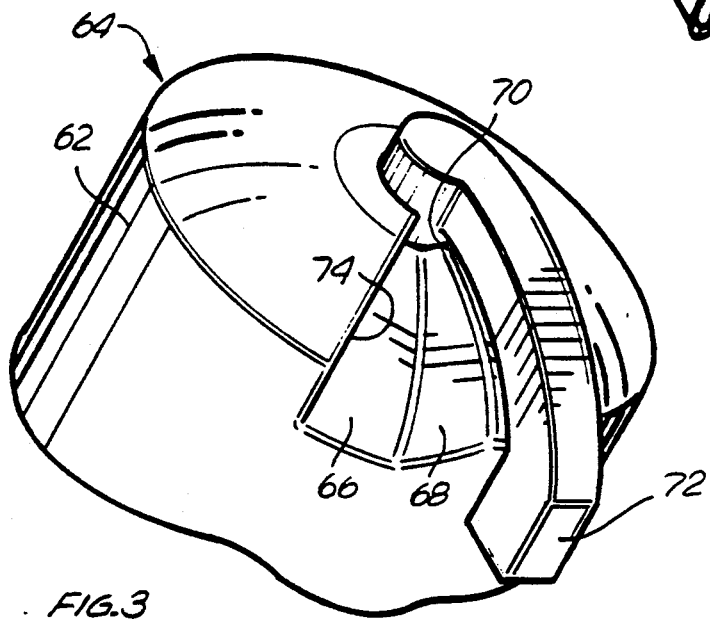
FIG. 3 is a view like FIG. 2 of an alternate embodiment.
Figure 4:
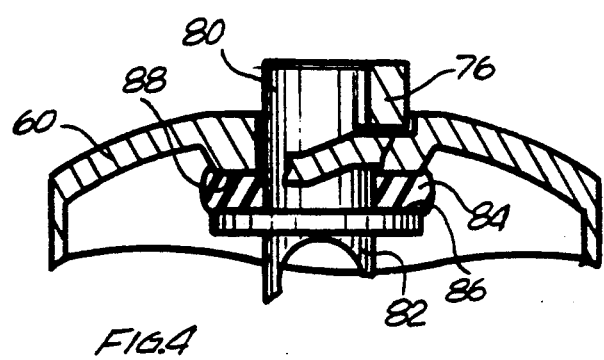
FIG. 4 is a partial side view in section illustrating details of the embodiment of FIG. 3.

Referring to FIGS. 3 and 4, an alternate embodiment is illustrated wherein an oil filter, designated generally by the numeral 64, is of the same general construction as the previous embodiment. The canister is formed at its outer end, with a radially extending arcuate cam comprising inner, intermediate and outer cam surfaces 66, 68 and 70, respectively. The inner surface 66 is a dwell surface and release position of the lever. The intermediate surface 68 is a sloped cam surface that cams the filter canister 60 forward and the lever 72 rearward relative to one another. The cam surfaces are formed between stop shoulders 74 and 76 on the outer end of the canister. These shoulders limit the rotational travel of the lever 72 and enable torque to be transmitted to the lever by rotation of the canister when installing or removing it.

The lever 72 is connected or fixed at an inner end thereof to the outer end of a central shaft 82 as in the previous embodiment, such that rotation of the lever 72 about the axis of the canister and of the central shaft moves the shaft 82 axially with respect to the oil system fitting. This, as in the previous embodiment, releases the annular seal of the housing against the coupling filter fitting and enables hand removal of the filter. As in the previous embodiment, the shaft 82 is sealed by means of an O-ring seal 84 disposed between a shoulder 86 and shoulder 88 on the inner surface of the canister housing 60. This seals the opening or bore 80 through which the shaft 82 extends.

As in the previous embodiment, the canister may be made or constructed of any suitable material, such as sheet metal or the like and/or suitable high temperature composites and other plastic materials. The canister itself may be constructed such that the end of the housing is sufficiently strong to support the cammed forces in forcing the canister and the shaft relative to one another.

Referring to FIGS. 5, 6, and 7, a further embodiment is illustrated wherein a cam concept similar to that of FIGS. 3 and 4 is applied to the inner end of the canister to operate between mounting means for the seal and the canister. As illustrated a canister 90 has an inner end closure comprising a substantially rigid support plate 92 secured over the end of the canister by means of a seal plate 94. The support plate 92 is formed with inlet ports 96 and with a threaded coupling or attachment and outlet port 98 for attachment to the filter attachment nipple.

A combination cam and seal mounting plate 100 is formed of sheet metal and the like, with a frusto-conical mounting section 102 for attachment to plates 92 and 94 by welding or suitable bonding. A cylindrical portion 104 of the plate 100 extends downward to an annular cam plate 106 having a plurality of cam lobes 108 and a seal retaining recess 110. An actuating arm mounting bracket 128 extends outward from one side of the plate. An annular seal 114 is mounted in the seal retaining recess 110 for engagement with the face of the filter mounting face.

A cam follower or actuator plate 116 has a central hub 118 rotatably mounted on cylindrical portion 104, with a radial plate portion 120 having cam recess or relief ports 122 into which cam lobes 108 extend for retraction of the seal 110. An actuating lever 124 is pivotally mounted by means of a pivot pin 126 in holes 112 and 130 in mounting bracket 128 and in a reinforcement plate 132. A connecting pin 134 on the inner end of the lever 124 extends into a slot 136 in cam actuator plate 120. An outer end of lever 124 includes an outwardly extending tab 138 for hand actuation of the lever 124.

In operation, the lever tab 138 is engaged and moved, resulting in the lever being pivoted to move or rotate cam actuating plate 116 so that the seal plate is cammed forward, as in FIG. 7, with lobes 108 engaging plate 120 between ports 122. The canister is then installed onto a filter mount for normal operation. When it is desired to remove the filter canister, lever 124 is pivoted to rotate plate 116, so that cam lobes 108 extend or drop into ports 122 so that the seal 114 is pulled away from the filter mount surface. The canister is then rotated counter-clockwise to remove it from the filter mounting nipple. This structure eliminates the shaft mounting holes and sealing required in the outer end of the canister for the prior embodiments.

In an alternate embodiment (not shown), the seal mount and cam plate rotate relative to the canister, with the cam actuating plate rotating with the canister. This structure would enable the canister to rotate relative to the mounting of the seal, and cam it forward when the canister is being installed, and to cam it backward or outward when removal torque is being applied thereto. This embodiment would eliminate the central shaft and its mounting bore on the outer end of the canister.

While we have illustrated and described our invention by means of specific embodiments, it is to be understood that numerous changes and modifications may be made therein without departing from the spirit and scope of the invention as defined in the appended claims.

We claim:

1. A quick release filter unit comprising:
   a filter canister having inlet and outlet means in a common end and a filter medium in a fluid flow path between said inlet and said outlet;
   coupling means comprising an elongated shaft member having an inner end and an outer end and reciprocably mounted in and extending coaxially of said canister, threaded means at said inner end for releasably coupling said canister to a filter fitting of a circulating fluid system and responsive to rotation of said canister for pulling said canister into sealing engagement with said fitting, and a passage extending from said inner end coaxially of said shaft and communicating with a central area of said canister in said common end;
   annular seal means for sealing said canister to said filter fitting; and
   release means comprising cam means and a lever operatively connected to said elongated shaft member for moving same relative to said canister and said seal means for releasing said annular seal means for reducing removal torque on said canister for enabling hand removal of said canister, said outer end of said shaft extends to the exterior of said canister at the outer end thereof and connected to said lever, and said cam means is operative between said lever and said outer end of said canister for moving said shaft axially of said canister.

2. A quick release filter unit according to claim 1 wherein said cam means is formed on an end of said lever and cooperatively engages said canister.

3. A quick release filter unit according to claim 1 wherein said cam means is formed on said outer end of said canister and is cooperatively engaged by said lever for moving said shaft axially of said canister.

4. A quick release disposable filter cartridge for detachably coupling to a filter fitting of a circulating fluid system, comprising;
   a canister having an open end and a closed end with inlet and outlet means coaxially disposed at said open end thereof;
   an annular seal means on said open end of said canister for sealingly engaging a filter fitting;
   coupling means comprising a shaft at said open end of said canister for coupling said canister to and drawing said annular seal means into said sealing engagement with said filter fitting in response to rotation of said canister; and
   quick release means for moving said coupling means axially relative to said seal means for releasing said seal from sealing engagement with said filter fitting for enabling low torque rotation of said canister and easy removal thereof wherein said shaft is hollow and defines one of said inlet and said outlet.

5. A quick release disposable filter cartridge according to claim 4 wherein said quick release means comprises cam means disposed externally of said canister and operative to move said seal means and said coupling means relative to one another.

6. A quick release disposable filter cartridge according to claim 4 wherein said coupling means comprises an elongated shaft coaxially mounted within said canister with a threaded inner end and an external outer end extending to the exterior of said canister; and
   a cam and a lever operatively coupled with said shaft for moving it relative to said canister.

7. A quick release disposable filter cartridge according to claim 6 wherein said cam in on said lever and is operative between said shaft and said canister.

8. A quick release disposable filter cartridge according to claim 6 wherein said cam is on an outer end of said canister and said lever is operative between said shaft and said cam on said canister.

9. A quick release disposable filter cartridge according to claim 8 wherein said cam is formed in said outer end of said canister and comprises an inner dwell and an outer dwell and a sloped ramp extending therebetween.

10. A quick release disposable filter cartridge according to claim 8 wherein said cam is disposed between stop means on said canister and said lever is operative to move between said stop means.

11. A quick release disposable filter cartridge for detachably coupling to a filter fitting of a circulating fluid system, comprising;
    a canister having an open end and a closed end with inlet and outlet means coaxially disposed at said open end thereof;
    annular seal means on said open end of said canister for sealingly engaging a filter fitting;
    coupling means on said open end of said canister for coupling said canister to and drawing said annular seal means into said sealing engagement with said filter fitting in response to rotation of said canister; and
    quick release means for moving said coupling means and said seal means axially relative to one another for releasing said seal from sealing engagement with said filter fitting for enabling low torque rotation of said canister and easy removal thereof wherein said quick release means comprises cam means disposed between said open end of said canister and said seal means and operative to move said seal means toward and away from said canister.

12. A quick release disposable filter cartridge according to claim 11 wherein said cam means comprises an annular plate having a plurality of cam lobes thereon on said open end of said canister, a rotatable plate disposed adjacent said annular plate and engageable with said cam lobes for selectively biasing said annular plate toward and away from said open end of said canister, and a lever operatively connected to said rotatable plate and extending outward from said canister for manual rotation of said rotatable plate.

* * * * *